Figure 1:
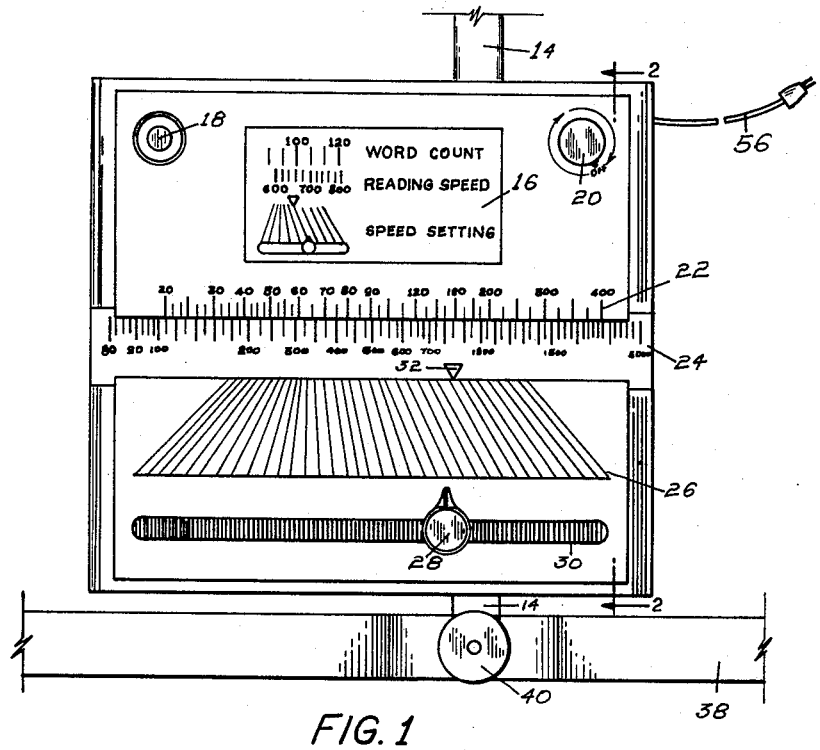

Dec. 22, 1964

W. S. SCHAILL 3,161,969

READING PACER

Filed Jan. 31, 1962

2 Sheets-Sheet 1

INVENTOR
WILLIAM S. SCHAILL
BY *John Gibson Semmes*
ATTORNEY

Dec. 22, 1964 W. S. SCHAILL 3,161,969
READING PACER
Filed Jan. 31, 1962 2 Sheets-Sheet 2

INVENTOR
WILLIAM S. SCHAILL
BY John Gibson Semmes
ATTORNEY

United States Patent Office 3,161,969
Patented Dec. 22, 1964

3,161,969
READING PACER
William S. Schaill, Bronxville, N.Y., assignor to The Reading Laboratory, Inc., New York, N.Y., a corporation of New York
Filed Jan. 31, 1962, Ser. No. 170,085
1 Claim. (Cl. 35—35)

The present invention relates to reading training devices, particularly a reading pacer used in training the student to read printed words at a predetermined rate.

Reading training devices of the present type generally include a pacer arm which is actuated horizontally to traverse and mask or index the printed lines of a book page or the like. The speed of movement of the pacer arm is correlated to the reading speed capability of the student. A principal shortcoming of conventional devices has been their reliance upon spring means for actuating the pacer arm with resultant metal fatigue, inaccuracy and inefficiency, as the device is used. Another shortcoming of conventional devices has been their complexity of moving parts necessitated for horizontally actuating the pacer arm.

The present invention simply comprises a housing, a channel supported between two walls of the housing, a power source and horizontally rotatable disc or plate suspended together from the channel, a pacer arm extensible through the bottom of the housing, and a vertically rotatable wheel supported between the horizontally rotatable plate and the pacer arm. Horizontal rotation of the plate by the power source is thus translated into horizontal or lineal movement of the pacer arm across a printed page being studied. The speed of lineal movement of the pacer arm is governed by transverse movement of the power source and plate upon the channel and with respect to the vertically rotatable wheel. When the vertically rotatable wheel is positioned at the center of the horizontally rotatable plate pacer arm speed is maximum and as the pacer arm is moved to the periphery of the horizontal plate, speed of the pacer arm is diminished. Previous inventors have utilized the principle of rotatable members disposed at right angles to each other, so as to induce lineal movement in a pacer. However, such devices have required three or more wheel members and the use of elaborate positioning fixtures.

Accordingly, it is an object of invention to provide a reading pacer which is utilizable with all types of material and books of varying size and thickness.

Another object of invention is to provide a reading pacer with a wide range of adjustable pre-set rates of pacing.

Another object of invention is to provide a reading pacer wherein springs are eliminated as the driving mechanism.

Figure 2:
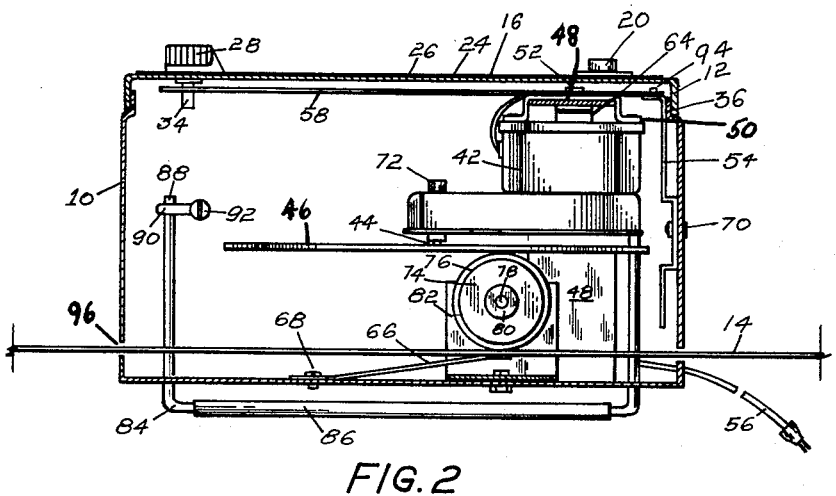
Figure 3:
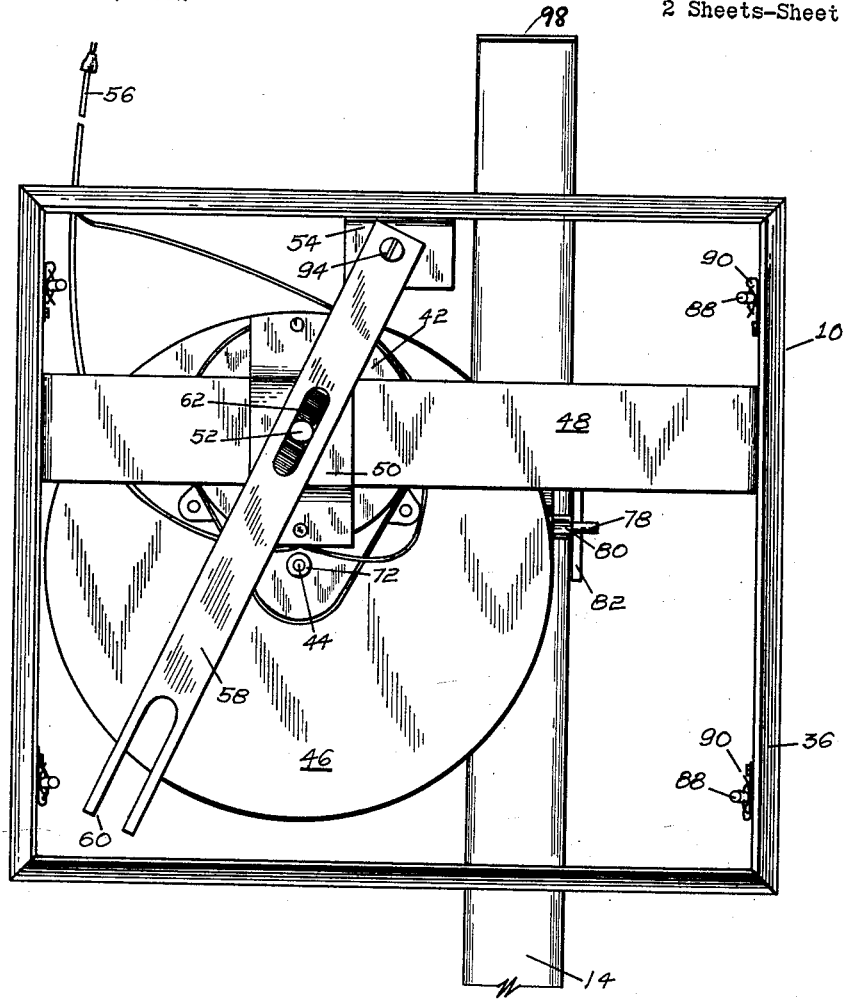

Yet, additional objects of invention will become apparent from the ensuing specification and attached drawings, wherein:

FIG. 1 is a top plan view of the pacer housing showing pacer control knob 28 positioned adjacent the speed setting index 26 and flexible pacer arm 14 extending from the housing over a page of printed matter 38;

FIG. 2 is a vertical section of the device showing power unit 42 and adjacent steel disc 46 suspended from channel 48 so as to engage vertically rotatable metal wheel 74 for translating the horizontal rotational movement of plate 46 to the lineal movement of pacer arm 14; and FIG. 3 is a top plan of the housing with the cover removed.

In FIGS. 1 and 2 housing 10 is shown as comprising upstanding sides with inwardly diverted top flanges 36 which accommodate cover 12. Cover 12 may be hinged to the housing by means of piano hinges or the like (not illustrated). Index 16 is placed upon cover 12 for correlating reading speed and word count per page with the speed setting of the pacer. In the middle of housing 10 the word count per page scale 22 is embossed. Transversely slidable reading scale 24 with reading speed index 32 is provided for positioning intermediate word count per page scale 22 and speed setting scale 26. Pacer speed control knob 28 is movable on top of the housing and is attached to shaft 34 which is slidable through aperture 30. Pacer on-off switch 20 is presented at the top of the housing, as is operating control light 18.

Pacer control arm 14 may be made of flexible steel and extends through housing 10 at slots 96, having circular tab or pointer 40 and at the other end vertical stop 98. Power source 42 is suspended within the housing upon channel 48 which is secured to two of the housing walls by screws or the like. Bracket 50 is employed for slidably suspending power unit 42 beneath channel 48. Leaf spring 64 may be employed to lend rigidity to the slidable fitting between power unit 42 and the bottom of channel 48. Power outlet 56 is provided for power source 42. Horizontally rotatable plate or disc 46 is fitted upon shaft 44 which is mounted in bearings 72. Disc 46 may be constructed of steel and have an approximate diameter of 5 inches. Bracket 82 is secured to the bottom of the housing by screws or the like and mounts wheel shaft 78 upon which vertically rotates metal wheel 74. Wheel 74, having a neoprene, rubber or like resilient cover 76, is positioned so as to abut the underside of disc 46 and the top of pacer arm 14. Leaf spring 66, secured by screws 78 in the bottom of the housing, urges pacer arm 14 against wheel 74 periphery. Control arm bracket 54 is mounted in a side of housing 10 by means of screws 70, and at its top pivots by means of screws 94 control arm 58 which has medial aperture 62 and bifurcated tip 60. A stud 52 projects from bracket 50 and engages aperture 52. As shown in FIG. 2, shaft 34 attached to the control knob 28 fits within the bifurcated tip portion 60. When control knob 28 is moved transversely about scale 26, control arm 58, power unit 42 and disc 46 are moved transversely of vertically rotatable wheel 74, affecting accordingly the rate of rotation of wheel 74 and the rate of lineal movement of pacer arm 14.

Power source 42 provides, of course, for the constant speed rotation of disc 46 in a horizontal plane. Wheel 74 being in a fixed position with respect to the housing is in constant contact with disc 46 and varies in rotational speed at its point of contact with disc 46 is moved from the center to the periphery of disc 46. Pacer arm 14 may be approximately 28" in length and 1" in width and by virtue of the pressure of leaf spring 66 is always in contact with wheel 74. Vertical flange stop 98 abuts housing 10 at the limit of extension of the pacer arm tab 40 from housing 10. The device may be recocked by pushing tab 40 against the housing, as illustrated in FIG. 1. The scales 22, 24 and 26 may be of the slide rule type, constructed of vinyl plastic or the like, and enable the student to translate into the words per minute and words per page any predetermined speed at which pacer arm 14 traverses the printed page.

As illustrated in FIG. 2, a pair of extensible legs 84, having vinyl or rubber coated foot portions 86 presented beneath housing 10, are secured within the housing by means of pressure clamps 90 fastened to the housing walls by screws 92 or the like. Upstanding leg ends 88 may be bent upwardly so as to engage clamps 90 and thereby limit downward extension of legs 84.

Manifestly, various changes in positioning of the horizontally rotatable plate and the vertically rotatable wheel, as well as the means employed for urging the pacer arm against the vertically rotatable wheel and the modifications of invention may be employed without departing from the spirit and scope of invention, as defined in the subjoined claim.

I claim:

A reading pacer device comprising:
(A) a housing;
(B) a channel supported between two interior walls of said housing;
(C) a power source slidably suspended from said channel;
(D) a horizontally rotatable plate depending from said power source and rotatable thereby in a horizontal plane;
(E) a pacer arm extending through the bottom of said housing at right angles to said channel;
(F) a vertical roller supported upon the bottom of said housing on a horizontal axis parallel to said channel and positioned beneath said horizontally rotatable plate and above said pacer arm and in rolling engagement with said plate;
(G) spring means fixed in the bottom of said housing beneath said pacer arm and resiliently urging said pacer arm against said vertically rotatable element for transmitting horizontal rotation of said plate to lineal movement of said arm through the bottom of said housing;
(H) a control arm horizontally pivoted at one end against a wall of said housing, a median portion of said control arm engaging said power source upon said channel for transversely positioning said power source and said horizontally rotatable plate with respect to said vertically rotatable element, and a free end of said control arm being presented beneath the top of said housing and having a vertical shaft extending through the top of said housing;
(I) a control knob extending through the top of said housing and engaging in said vertical shaft the free end of said control arm;
(J) a word count per page and speed setting scale positioned beneath said control knob upon the top of said housing; and
(K) an extensible leg member supported within the walls of said housing and adjustably extensible through the bottom of said housing for support of said housing and said pacer arm above a book being studied.

References Cited by the Examiner
UNITED STATES PATENTS 2,605,558  8/52  Lehner et al. _____ 35—35.2
2,984,916  5/16  Balchuns _____ 35—35.2

JEROME SCHNALL, *Primary Examiner.*

L. SMILOW, *Examiner.*